(12) United States Patent
Havdala et al.

(10) Patent No.: US 12,184,687 B1
(45) Date of Patent: Dec. 31, 2024

(54) TECHNIQUES FOR MAPPING SECURITY CONTROLS TO CYBER THREATS

(71) Applicant: Zafran Security LTD, Tel Aviv (IL)

(72) Inventors: Snir Havdala, Tel Aviv (IL); Ben Seri, Ramat Gan (IL)

(73) Assignee: Zafran Security LTD, Tel Aviv (IL)

( * ) Notice: Subject to any disclaimer, the term of this patent is extended or adjusted under 35 U.S.C. 154(b) by 0 days.

(21) Appl. No.: 18/649,492

(22) Filed: Apr. 29, 2024

Related U.S. Application Data

(60) Provisional application No. 63/570,553, filed on Mar. 27, 2024.

(51) Int. Cl.
H04L 9/40 (2022.01)

(52) U.S. Cl.
CPC ...... *H04L 63/1441* (2013.01); *H04L 63/1425* (2013.01)

(58) Field of Classification Search
CPC . H04L 63/1433; H04L 63/1466; H04L 63/20; H04L 63/1441; H04L 63/1425; G06F 16/9024; G06F 21/57
See application file for complete search history.

(56) References Cited

U.S. PATENT DOCUMENTS

| | | | |
|---|---|---|---|
| 8,468,244 B2 | 6/2013 | Redlich et al. | |
| 9,697,355 B1 | 7/2017 | Park et al. | |
| 9,807,109 B2 | 10/2017 | Laidlaw et al. | |
| 10,250,619 B1 | 4/2019 | Park et al. | |
| 10,339,321 B2 | 7/2019 | Tedeschi | |
| 11,184,401 B2 | 11/2021 | Crabtree et al. | |
| 11,297,109 B2 | 4/2022 | Crabtree et al. | |
| 11,316,875 B2 | 4/2022 | Frey et al. | |
| 11,902,322 B2 | 2/2024 | Hutchinson et al. | |

(Continued)

OTHER PUBLICATIONS

Andrew et al., "Knowledge Graphs for Cybersecurity: A Framework for Honeypot Data Analysis," 2023 IEEE International Conference on Cryptography, Informatics, and Cybersecurity (ICoCICs) Year: 2023 | Conference Paper | Publisher: IEEE.*

(Continued)

*Primary Examiner* — Roderick Tolentino
(74) *Attorney, Agent, or Firm* — M&B IP Analysts, LLC

(57) ABSTRACT

A system and method for security control mapping. A method includes defining security control capability nodes corresponding to security control capabilities of security controls, wherein each security control capability node represents a corresponding security control capability, wherein each security control is a cybersecurity tool; defining cyber threat pattern nodes corresponding to cyber threat patterns of cyber threats, wherein each cyber threat pattern node represents a corresponding cyber threat pattern; establishing edges, wherein the edges include a first set of edges defined between the security control capability nodes and the cyber threat pattern nodes, wherein the edges collectively represent a predetermined effectiveness of each security control capability of for addressing at least one respective cyber threat pattern; creating a mapping including the control capability nodes connected at least via the edges to the cyber threat pattern nodes; and performing at least one remediation action based on the mapping.

19 Claims, 7 Drawing Sheets

(56) References Cited

U.S. PATENT DOCUMENTS

| | | | |
|---|---|---|---|
| 2008/0282320 A1* | 11/2008 | DeNovo | G06F 21/604 |
| | | | 726/1 |
| 2019/0025805 A1 | 1/2019 | Cella et al. | |
| 2019/0025812 A1 | 1/2019 | Cella et al. | |
| 2019/0034639 A1 | 1/2019 | Sloan et al. | |
| 2019/0207981 A1 | 7/2019 | Sweeney et al. | |
| 2020/0005633 A1 | 1/2020 | Jin et al. | |
| 2020/0389495 A1 | 12/2020 | Crabtree et al. | |
| 2020/0412767 A1 | 12/2020 | Crabtree et al. | |
| 2021/0026960 A1* | 1/2021 | Martin | G06F 3/067 |
| 2021/0029029 A1* | 1/2021 | Mehmedagic | H04L 41/40 |
| 2021/0075626 A1 | 3/2021 | Ilany et al. | |
| 2021/0234885 A1 | 7/2021 | Campbell | |
| 2021/0336992 A1 | 10/2021 | Shivanna et al. | |
| 2022/0078210 A1 | 3/2022 | Crabtree et al. | |
| 2022/0103577 A1* | 3/2022 | Shah | H04L 63/1416 |
| 2022/0366045 A1* | 11/2022 | Summers | G06F 8/60 |
| 2023/0262073 A1* | 8/2023 | Sheu | H04L 63/1433 |
| | | | 726/23 |
| 2023/0328075 A1* | 10/2023 | Almasan | H04L 63/1416 |
| 2023/0370439 A1* | 11/2023 | Crabtree | H04L 63/0428 |
| 2023/0388320 A1* | 11/2023 | Lu | H04L 63/1416 |
| 2024/0305664 A1* | 9/2024 | McCarthy | H04L 63/1441 |

OTHER PUBLICATIONS

Zakaria et al., "Feature Extraction and Selection Method of Cyber-Attack and Threat Profiling in Cybersecurity Audit," 2019 International Conference on Cybersecurity (ICoCSec) Year: 2019 | Conference Paper | Publisher: IEEE.*

* cited by examiner

TECHNIQUES FOR MAPPING SECURITY CONTROLS TO CYBER THREATS

CROSS-REFERENCE TO RELATED APPLICATIONS

This application claims the benefit of U.S. Provisional Patent Application No. 63/570,553 filed on Mar. 27, 2024, the contents of which are hereby incorporated by reference.

TECHNICAL FIELD

The present disclosure relates generally to cybersecurity using security controls, and more specifically to securing computing environments using mappings of controls to potential cyber threats.

BACKGROUND

As organizations providing and utilizing computing services grow, so do their cybersecurity needs. In particular, increased use of computing resources can result in exponentially more cybersecurity issues in daily operations. As a result, the number of indicators of cyber threats such as security policy violations and anomalies which might need mitigation can become unwieldy.

Failure to address potential cyber threats can allow those threats to succeed, thereby causing significant harm in forms such as downtime, stolen data, improper access to services, and the like. Thus, solutions which aid in maximizing the number of cyber threats that can be mitigated are desirable.

To address potential cyber threats, organizations may use cybersecurity tools in the form of security controls. These security controls may be configured to detect potential threats, to perform actions to remediate potential threats, or both. Breaches or other cybersecurity events may occur when security controls fail to protect certain assets.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for security control mapping. The method comprises: defining a plurality of security control capability nodes corresponding to a plurality of security control capabilities of a plurality of security controls, wherein each security control capability node represents a corresponding security control capability of the plurality of security controls, wherein each security control is a cybersecurity tool; defining a plurality of cyber threat pattern nodes corresponding to a plurality of cyber threat patterns of a plurality of cyber threats, wherein each cyber threat pattern node represents a corresponding cyber threat pattern of the plurality of cyber threat patterns; establishing a plurality of edges, wherein the plurality of edges includes a first plurality of edges defined between the plurality of security control capability nodes and the plurality of cyber threat pattern nodes, wherein the plurality of edges collectively represent a predetermined effectiveness of each security control capability of the plurality of security control capabilities for addressing at least one respective cyber threat pattern of the plurality of cyber threat patterns; creating a mapping including the plurality of security control capability nodes connected at least via the plurality of edges to the plurality of cyber threat pattern nodes; and performing at least one remediation action based on the mapping.

Certain embodiments disclosed herein also include a non-transitory computer readable medium having stored thereon causing a processing circuitry to execute a process, the process comprising: defining a plurality of security control capability nodes corresponding to a plurality of security control capabilities of a plurality of security controls, wherein each security control capability node represents a corresponding security control capability of the plurality of security controls, wherein each security control is a cybersecurity tool; defining a plurality of cyber threat pattern nodes corresponding to a plurality of cyber threat patterns of a plurality of cyber threats, wherein each cyber threat pattern node represents a corresponding cyber threat pattern of the plurality of cyber threat patterns; establishing a plurality of edges, wherein the plurality of edges includes a first plurality of edges defined between the plurality of security control capability nodes and the plurality of cyber threat pattern nodes, wherein the plurality of edges collectively represent a predetermined effectiveness of each security control capability of the plurality of security control capabilities for addressing at least one respective cyber threat pattern of the plurality of cyber threat patterns; creating a mapping including the plurality of security control capability nodes connected at least via the plurality of edges to the plurality of cyber threat pattern nodes; and performing at least one remediation action based on the mapping.

Certain embodiments disclosed herein also include a system for [to be completed based on final claims]. The system comprises: a processing circuitry; and a memory, the memory containing instructions that, when executed by the processing circuitry, configure the system to: define a plurality of security control capability nodes corresponding to a plurality of security control capabilities of a plurality of security controls, wherein each security control capability node represents a corresponding security control capability of the plurality of security controls, wherein each security control is a cybersecurity tool; define a plurality of cyber threat pattern nodes corresponding to a plurality of cyber threat patterns of a plurality of cyber threats, wherein each cyber threat pattern node represents a corresponding cyber threat pattern of the plurality of cyber threat patterns; establish a plurality of edges, wherein the plurality of edges includes a first plurality of edges defined between the plurality of security control capability nodes and the plurality of cyber threat pattern nodes, wherein the plurality of edges collectively represent a predetermined effectiveness of each security control capability of the plurality of security control capabilities for addressing at least one respective cyber threat pattern of the plurality of cyber threat patterns; create a mapping including the plurality of security control capability nodes connected at least via the plurality of edges to the plurality of cyber threat pattern nodes; and performing at least one remediation action based on the mapping.

Certain embodiments disclosed herein include the method, non-transitory computer readable medium, or system noted above, wherein the plurality of cyber threats is a plurality of first cyber threats, further including or being configured to perform the following step or steps: determining at least one cyber threat pattern of a second cyber threat; and determining at least one control capability for mitigating the second cyber threat based on the determined at least one cyber threat pattern threat and the mapping, wherein the at least one remediation action is determined based further on the determined at least one control capability for mitigating the second cyber threat.

Certain embodiments disclosed herein include the method, non-transitory computer readable medium, or system noted above, further including or being configured to perform the following step or steps: adding, to the mapping, a plurality of markers indicating a control capability status for at least a portion of the plurality of security control capabilities, wherein the at least one remediation action is determined based further on the plurality of markers.

Certain embodiments disclosed herein include the method, non-transitory computer readable medium, or system noted above, further including or being configured to perform the following step or steps: deduplicating instances of asset-identifying data generated by the plurality of security controls, wherein deduplicating the instances includes uniquely identifying each of the instances as corresponding to a respective protected computing asset by correlating between sets of the asset-identifying data output by respective security controls of the plurality of security controls based on the mapping; identifying at least one security control gap based on the deduplicated instances, wherein the at least one remediation action is determined based further on the identified at least one security control gap.

Certain embodiments disclosed herein include the method, non-transitory computer readable medium, or system noted above, further including or being configured to perform the following step or steps: identifying at least one security control gap based on the mapping, wherein identifying the at least one security control gap further includes determining a path of exploitation between a respective computing asset and at least one of the plurality of security controls, wherein the at least one remediation action is determined based further on the identified at least one security control gap.

Certain embodiments disclosed herein include the method, non-transitory computer readable medium, or system noted above, further including or being configured to perform the following step or steps: integrating with the plurality of security controls, wherein integrating with the plurality of security controls further comprises deploying an artifact in a computing environment, wherein the artifact is configured to record a plurality of activities performed in the computing environment by the plurality of security controls, wherein the mapping is created based further on the recorded plurality of activities.

Certain embodiments disclosed herein include the method, non-transitory computer readable medium, or system noted above, wherein the plurality of cyber threat pattern nodes is defined based further on at least one predetermined set of tactics, techniques, and procedures.

Certain embodiments disclosed herein include the method, non-transitory computer readable medium, or system noted above, wherein the plurality of security control capabilities include at least one of: anti-spyware features, vulnerability detection features, uniform resource filtering features, file blocking features, data filtering features, and denial of service protection features.

Certain embodiments disclosed herein include the method, non-transitory computer readable medium, or system noted above, wherein performing the remediation actions includes reconfiguring at least one of the plurality of security controls.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1A:
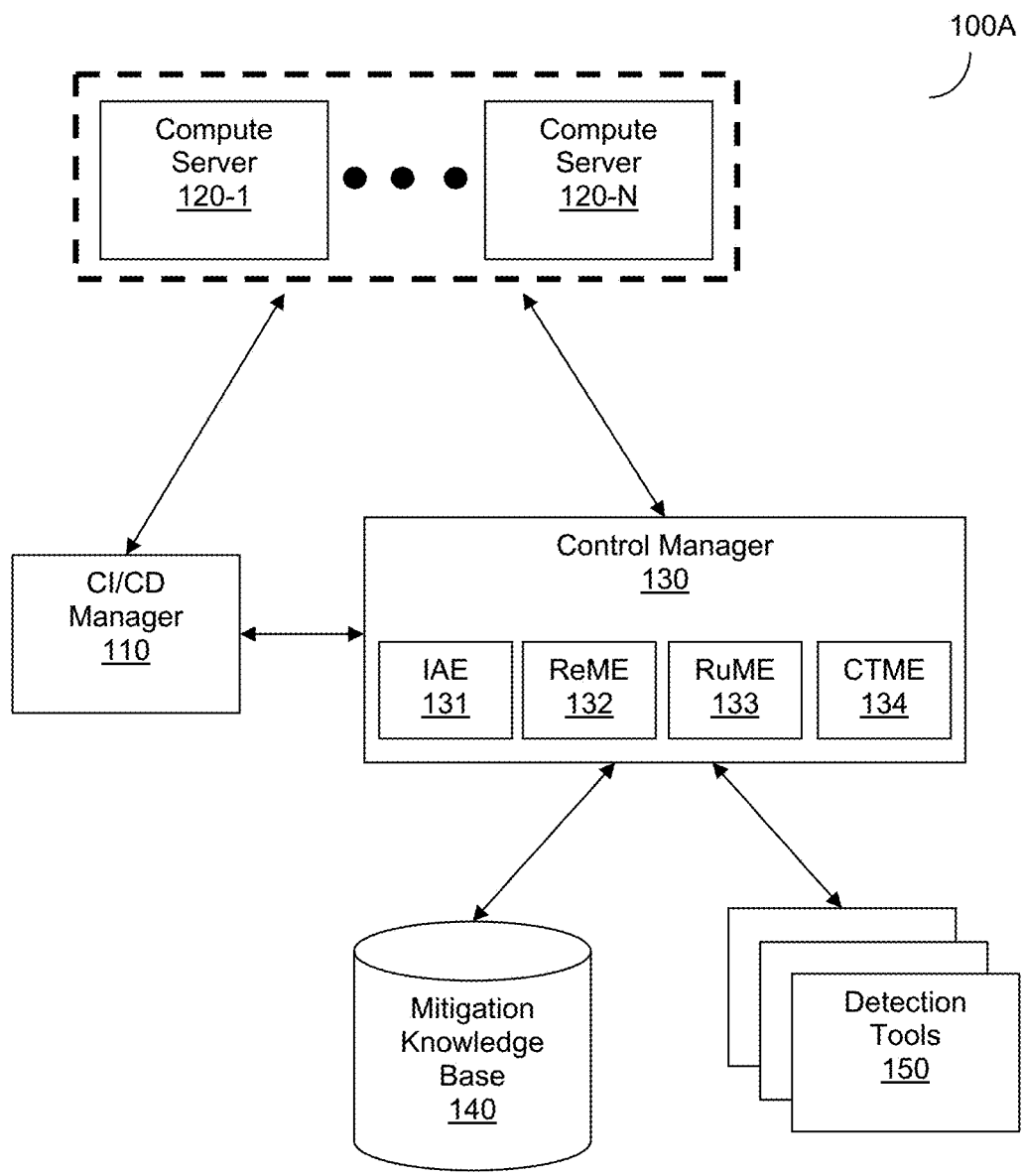
FIGS. 1A-B are network diagrams utilized to describe various disclosed embodiments.

The various disclosed embodiments techniques for mapping security controls (also referred to as "controls") to cyber threats as well as techniques which utilize the mapping to identify control gaps in order to secure computing environments. Specifically, the disclosed embodiments utilize mappings between control features or other discrete capabilities of controls and known attack vectors or other discrete aspects of known cyber threats in order to identify relationships between control configurations and deployments with cyber threats. These relationships, in turn, may be utilized for purposes such as identifying gaps in security related to controls which might cause controls to fail to adequately protect a computing asset, deduplicating instances of assets indicated in data from different controls, automatically determining remediation actions which might aid in remediating a particular cyber threat, running simulations of different control deployments and configurations to be used for analyzing risks, and more.

Each control is a cybersecurity tool such as a process or other computing component configured to detect vulnerabilities, to mitigate vulnerabilities, or both. In an embodiment, controls to be mapped are analyzed in order to identify control features available to respective controls. Such an analysis may include analyzing code of the controls, metadata of the controls, or other data indicating capabilities of the controls.

In some embodiments, the mapping is defined using features of security controls such as, but not limited to, anti-spyware features, vulnerability detection features, uniform resource locator (URL) filtering features, file blocking features, data filtering features, denial of service (DOS) protection features, combinations thereof, and the like. That is, the control features include features used for control operations including detecting potential cyber threats, mitigating potential cyber threats, both, and the like. More specifically, the potential cyber threats may be detected as vulnerabilities, and mitigation actions for mitigating those potential cyber threats may be realized by performing mitigation actions including deploying or reconfiguring controls in order to realize a set of control features which collectively remediates a cyber threat having certain characteristics (i.e., aspects such as attack patterns).

In this regard, it has been identified that mapping controls with respect to discrete features rather than mapping the controls as a whole may improve granularity of insight into effectiveness of different controls for potential cyber threats. That is, by mapping controls to cyber threats with respect to the specific control features which are effective at mitigating certain attack patterns, controls which are capable of adequately protecting against those attack patterns can be selected more accurately.

It is further noted that developers of cybersecurity tools often suggest that their tools are effective at mitigating cyber threats, but the touted benefits of cybersecurity tools may not always be accurate. For example, a provider of a cybersecurity tool may point to a list of potential cyber threats and indicate that the tool is effective for mitigating all cyber threats among the list when in reality the tool lacks features which would be effective for mitigating some of those cyber threats. Relying on such information when determining remediation actions may therefore lead to selecting cybersecurity tools which do not adequately protect assets against potential cyber threats. Accordingly, mapping control features to patterns of cyber threats allows for selecting tools which have appropriate combinations of features to effectively mitigate different aspects of a given cyber-attack, thereby improving security of environments secured using remediation actions determined using the mapping.

In a further embodiment, the control features are mapped to patterns known to be associated with respective cyber threats. More specifically, the control features are mapped to patterns which the control features are known or otherwise touted as being effective at addressing (e.g., detecting, mitigating, or both). Such patterns may be known patterns of cyber-attacks, for example, as predetermined and defined in a set of known tactics, techniques, and procedures (TTPs). Such TTPs can be utilized to identify previously observed attack patterns, which in turn may be utilized to define attack patterns in a manner which may be represented as nodes in a graph or otherwise may allow for mapping.

Figure 1B:
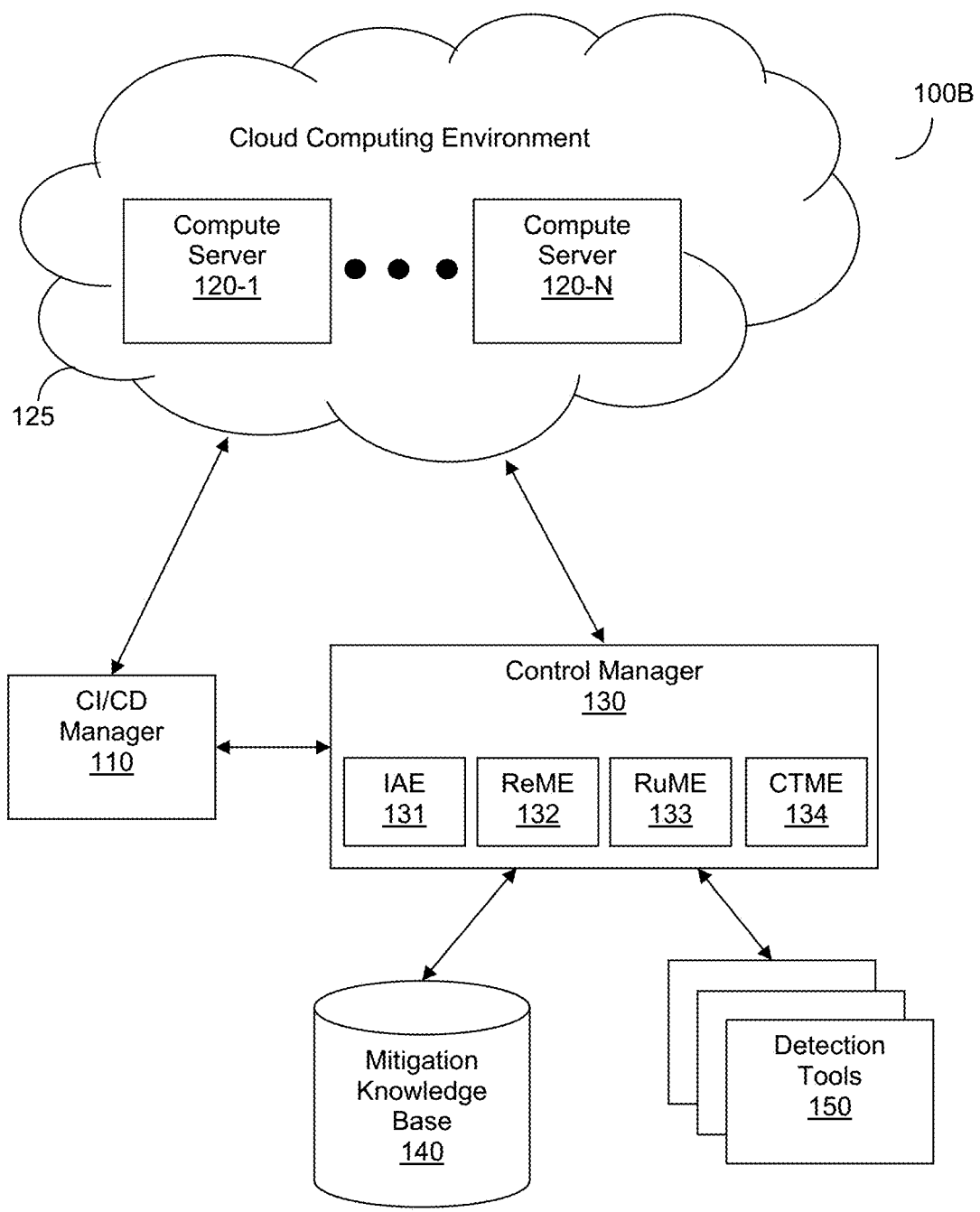

FIGS. 1A and 1B are example network diagrams 100A and 100B, respectively, utilized to describe various disclosed embodiments.

The network diagram 100A depicts an on-premises implementation in which a control manager 130 is deployed on-premises with one or more compute servers 120-1 through 120-N (where N is an integer having a value equal to or greater than 1). As shown in the diagram 100A, the control manager 130 communicates with a continuous integration/continuous development (CI/CD) manager 110, the compute servers 120, a mitigation knowledge base 140, and one or more detection tools 150.

The CI/CD manager 110 is configured to manage software components, hardware components, process components, and other parts of a computing infrastructure (not separately depicted) realized at least partially using the compute servers 120. To this end, the CI/CD manager 110 may be configured to deploy code uploaded by one or more developers (not shown), to enforce policies for the computing infrastructure (e.g., on the compute servers 120, both, and the like. When policies requiring signing code with artifacts are utilized as described herein, the CI/CD manager 110 may be configured to enforce such policies.

The compute servers 120 are configured to run processes and perform other activities pursuant to operation of the computing infrastructure in which they are deployed. In accordance with various disclosed embodiments, mitigation actions may be performed through the compute servers 120. To this end, in some embodiments, one or more artifacts are deployed in the compute servers 120, for example, as part of code deployed in the compute servers 120 via one or more code releases signed with the artifact as described herein. Accordingly, executable code of the artifact used to track and monitor mitigation activities as well as to perform code modification as described herein may be stored on or otherwise accessed and executed by the computer servers 120 in order to perform at least a portion of the disclosed embodiments.

The control manager 130 is configured to perform at least a portion of the disclosed embodiments including, but not limited to, mapping control features of controls to attack patterns and remediating potential threats based on the mapping (e.g., as discussed further below with respect to FIG. 2). To aid in remediating potential threats using the mapping, the control manager 130 may be further configured to perform risk scoring in an impact analysis process, to integrate with controls, or both.

To aid in various disclosed embodiments, the control manager 130 may be configured to build or utilize a mitigation knowledge base 140. To this end, in some embodiments, the control manager 130 may be configured with any or all of an impact analysis engine (IAE) 131, a reachability mitigation engine (ReME) 132, a runtime mitigation engine (RuME) 133, and a compile time mitigation engine (CTME) 134. The impact analysis engine 131 is configured to perform impact analysis in order to determine potential impacts of risks, for example, risks posed by control gaps identified as discussed herein. The engines 132, 133, and 134, are configured to perform mitigation actions related to reachability, runtime code modification, and compiler time code modification, respectively.

The mitigation knowledge base 140 defines one or more possible mitigation actions to be performed by mitigation engines (e.g., any of the engines 132, 133, and 134) for known vulnerable states. More specifically, the mitigation knowledge base defines respective mitigation actions to be performed by each mitigation engine for different vulnerable states such as, but not limited to, vulnerable states defined in one or more common vulnerabilities and exposures (CVE, not shown). These mitigation actions may be used to remediate control gaps by performing remediation actions including certain mitigation actions as discussed herein. In some implementations, the mitigation knowledge base 140 may be built by one or more other systems (not shown).

The controls 150 include cybersecurity tools which are configured to detect potential vulnerable states, to mitigate potential cyber threats, or both. The potential vulnerable states may include, but are not limited to, vulnerabilities and exposures. To this end, the controls 150 may be configured to generate and send alerts about any detected vulnerable states. In accordance with various disclosed embodiments, the control manager 130 may be configured to map features of the controls 150 to respective attack patterns and to utilize such mapping to secure one or more computing environments (not shown in FIG. 1A) which the controls 150 are deployed in order to detect potential threats or perform mitigation actions within. The controls 150 may alert on the vulnerable states using definitions of the vulnerable states from a CVE such that different detection tools may alert on vulnerable states in a comparable manner.

The network diagram 100B depicts a cloud-based implementation in which the compute servers 120 are deployed in a cloud computing environment 125. The control manager 130, the CI/CD manager 110, or both, may be deployed outside of such a cloud computing environment 125 and may communicate with the compute servers 120 via one or more cloud networks, the Internet, or any other networks (not shown) utilized to enable communications with the compute servers 120. Such networks may include, but are not limited to, a wireless, cellular or wired network, a local area network (LAN), a wide area network (WAN), a metro area network (MAN), the Internet, the worldwide web (WWW), similar networks, and any combination thereof.

Figure 2:
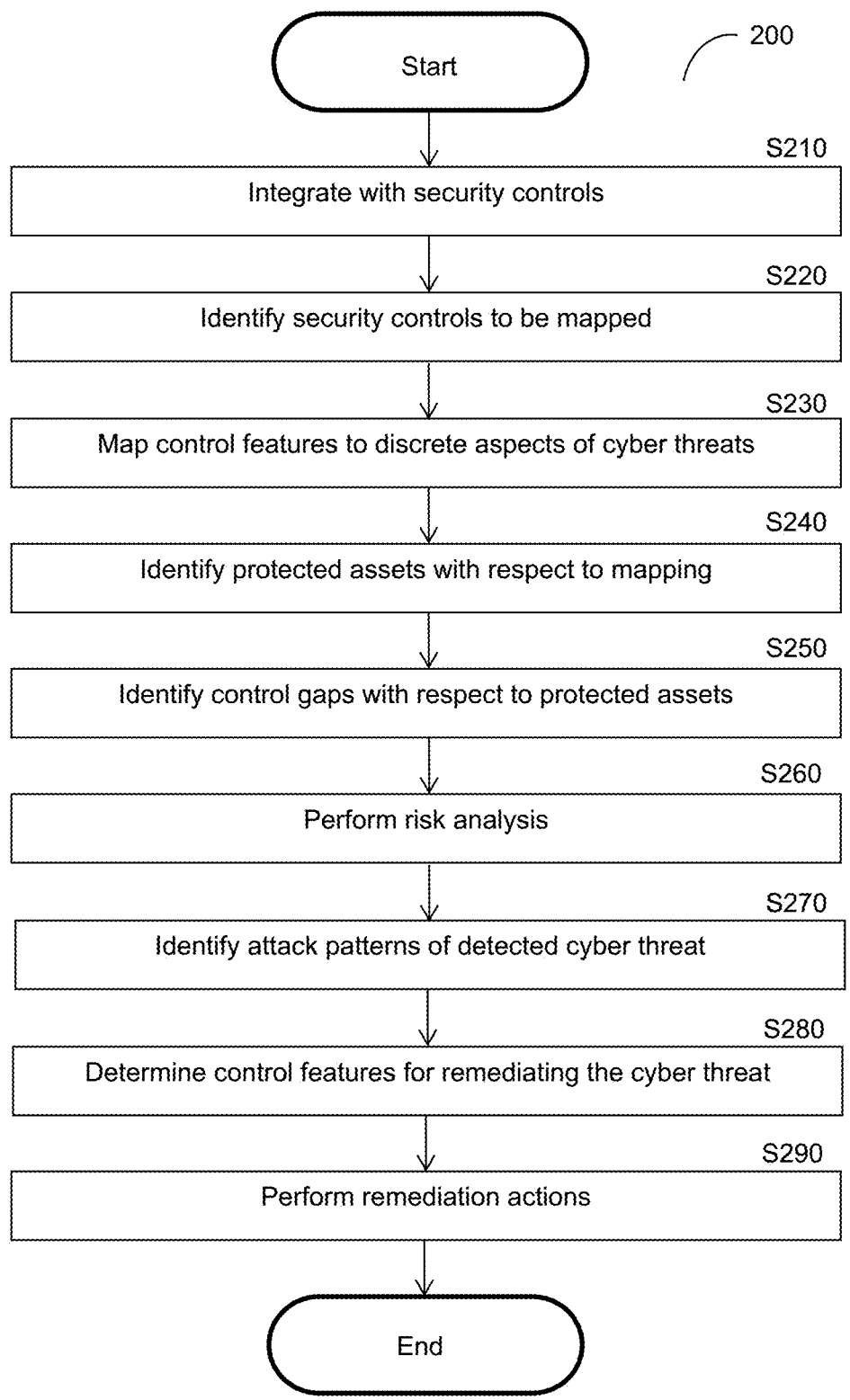
FIG. 2 is a flowchart illustrating a method for securing computing environments via mapping security controls to cyber threats according to an embodiment.

FIG. 2 is a flowchart 200 illustrating a method for securing computing environments via mapping security controls to cyber threats according to an embodiment. In an embodiment, the method is performed by the control manager 130, FIGS. 1A-B.

At optional S210, integration is performed with at least a portion of a set of security controls (also referred to as "controls") deployed with respect to a computing environment. That is, integration is performed in order to integrate with some or all of the security controls configured to detect potential cyber threats, to perform remediation actions with respect to potential cyber threats, or both, within the computing environment.

In an embodiment, the integration includes a system (e.g., the system configured to perform the method of FIG. 2 such as the control manager 130, FIGS. 1A-B) integrating with the controls. The integration is performed in order to enable the system to obtain data related to control deployments and other infrastructure activities which may be performed by or in relation to the controls, which in turn may be utilized to identify the controls and gaps in controls as discussed further below. In particular, the integration may be utilized to determine aspects of control deployments and configurations as well as assets protected by existing controls deployed with respect to the computing environment.

In an embodiment, the integration is realized via one or more artifacts. More specifically, in such an embodiment, integrating with the security controls includes defining and deploying such artifacts in a computing environment having assets to be protected by the controls for which control gaps may be identified. In a further embodiment, each artifact is or includes instructions in the form of executable code that, when executed by a processing circuitry, configure the processing circuitry to at least perform certain activities such as, but not limited to, tracking and recording mitigation activities being performed in a computing infrastructure in which it is deployed, as well as making adjustments within the computing infrastructure (e.g., adjusting configurations of components, altering executable code at runtime, altering compiler code, combinations thereof, and the like). An example process for integrating with security controls by deploying artifacts is described further below with respect to FIG. 5.

At S220, security controls (also referred to as "controls") to be mapped are identified. Specifically, the identified security controls may include security controls deployed with respect to the computing environment. In an embodiment, each control is a cybersecurity tool such as a process or other computing component configured to detect vulnerabilities, to mitigate vulnerabilities, or both. Each control may include or otherwise be configured with software instructions utilized to realize one or more control features such as, but not limited to, anti-spyware, vulnerability detection, uniform resource locator (URL) filtering, file blocking, data filtering, denial of service (DOS) protection, and the like. The control features may be defined as capabilities of the controls or other features known to be associated with respective controls.

In an embodiment, the identified security controls include the security controls integrated at S210. Further, security controls may also be identified based on data from other security controls such as the controls integrated at S210. Alternatively or additionally, some or all of the security controls may be identified based on data indicating software components deployed in or otherwise used with respect to the computing environment such as, but not limited to, a list of software components of the computing environment.

At S230, the identified security controls are mapped to cyber threats. More specifically, in an embodiment, discrete capabilities of the security controls (e.g., control features) are mapped to respective discrete aspects of cyber threats (e.g., attack patterns). In an embodiment, mapping the security controls to the cyber threats results in a mapping including nodes and edges, where at least some of the nodes represent discrete capabilities of security controls and at least some of the nodes represent aspects of cyber threats. The edges connect nodes and, in an embodiment, the edges connect directly or indirectly between security control capability nodes and cyber threat aspect nodes.

The mapping may further include other nodes such as, but not limited to, but are not limited to, nodes representing assets, nodes representing components used in attacks, nodes representing other software components which may access the assets, other software components which may manage access to the assets, networks or network components via which the assets can be accessed, combinations thereof, and the like.

By mapping in this more granular fashion, mitigation can be improved. That is, by mapping specific control features to attack patterns, the appropriate control configurations, deployments, or a combination of configurations and deployments, can be determined more accurately determined for mitigating a given cyber threat. As noted above, control metadata or other information describing a security control may tout that the control is effective at mitigating various cyber threats in a blanket fashion even when the security control lacks features which would realistically be needed to effectively mitigate a given attack pattern or otherwise a cyber threat having certain characteristics.

Mapping certain control features to aspects of cyber threats therefore allows for more accurately identifying whether a given set of controls having certain configurations and deployments will be effective at mitigating a cyber threat directed at an asset as well as how control configurations, deployments, or both, may be modified in order to effectively mitigate a given cyber threat.

At S240, assets to be protected (also referred to as "protected assets") by security controls within the computing environment are identified with respect to the mapping. Each protected asset is a computing asset deployed in a computing environment such as, but not limited to, a hardware asset (e.g., a server), a software asset (e.g., an application, a process, a function, a software container, a virtual machine, etc.), or a network asset (e.g., a router, switch, server, firewall, etc.).

More specifically, in an embodiment, the assets are identified with respect to sets of asset-identifying data representing respective assets. As discussed further below, at least some of the sets of asset-identifying data may be sets of data from different controls that represent the same underlying asset but express the identity of that asset using different types of identifying data, different values of identifying data, both, and the like. Such different sets of asset-identifying data may be deduplicated as discussed below with respect to S250 in order to uniquely identify the assets after the initial identification of sets of data representing respective assets.

In an embodiment, identifying the assets to be protected includes analyzing data indicating software components deployed in the computing environment. Such data may include, but is not limited to, lists of software components for the computing environment. When security controls are integrated with (e.g., as discussed above with respect to S210), at least some of the assets may be identified based on data from the integrated security controls.

At optional S250, security control gaps (also referred to as "control gaps") are identified with respect to the protected assets. Each security control gap may be or may include a gap in security defined with respect to a computing asset protected by one or more security and may be defined with respect to one or more lacking types of controls, one or more specific control features which are lacking, or a combination thereof. In a further embodiment, each control gap is or includes a gap in configuration, deployment, or both, of the controls with respect to a given protected asset. Such a control gap may cause the controls to fail to adequately protect the asset against potential cyber threats. The control gaps may be or may include gaps defined with respect to coverage, capabilities, conflicting control policies, missing software components such as plugins, combinations thereof, and the like.

In some embodiments, identifying the control gaps may further include determining potential paths of exploitation. In a further embodiment, each potential path of exploitation may be identified as a path of communication via one or more components that lead from a protected asset to the Internet or one or more other external networks. That is, in such a further embodiment, a potential path of exploitation may be defined based on a set of components, devices, systems, combinations thereof, and the like, which are involved in communications used to access the protected asset from one or more public-facing networks such as the Internet. These paths to public-facing networks may, if exploited, result in unauthorized access to or use of the asset.

Such potential paths of exploitation may be utilized to determine potential deployment locations, which in turn may be utilized to identify control gaps. To this end, in such an embodiment, identifying such control gaps includes determining, for each potential path of exploitation, whether a control is deployed along the potential path of exploitation and, in particular, such that the control is in-line between the asset and one or more other computing components along the potential path of exploitation, or otherwise deployed such that the control detects or mitigates threats realized via traffic between the asset and the other computing components along the potential path of exploitation.

In some embodiments, identifying the control gaps further includes deduplicating instances of assets from different controls whose control features are represented in the mapping. To this end, in such an embodiment, S260 further includes performing deduplication. Specifically, asset deduplication may be performed with respect to asset-identifying data from those controls, and may include enriching and correlating the asset-identifying data in order to uniquely identify assets between lists, i.e., such that each portion of asset-identifying data from the controls may be determined as corresponding to one asset and not to other assets.

Uniquely identifying assets in this manner may therefore be utilized for the control gap identification. For example, by uniquely identifying a specific asset among data from two different controls which collectively provide all security features required to protect a given asset, it may be determined that there is no control gap for that asset.

In an embodiment, deduplicating the instances of the assets includes determining that multiple instances of assets represent the same asset. In a further embodiment, deduplicating the assets includes obtaining lists of assets from each control, analyzing the lists to determine sets of asset-identifying data in the lists, and correlating between sets of asset-identifying data from different controls. Each set of asset-identifying data indicates an identity of a respective instance of an asset, and may be expressed in the form of one or more identity properties. In yet a further embodiment, correlating the instances of assets includes applying one or more predetermined sets of asset correlation rules between sets of asset-identifying data. Such asset correlation rules may define a number of identity properties, specific identity properties, both, and the like, needed to match instances of assets as belonging to the same underlying asset between different sets of asset-identifying data.

One or more assets are uniquely identified from among the lists of assets based on the correlation. More specifically, uniquely identifying an asset includes identifying two or more instances of the asset on different lists. That is, each asset is uniquely identified as being the same underlying asset despite any differences in expression of the identity of the asset between different lists. Each uniquely identified asset may be identified with respect to two or more instances of assets.

The identity properties may include, but are not limited to, name or other asset-specific identifiers (e.g., a Media Access Control [MAC] address), asset type, network address (e.g., Internet Protocol [IP] address), combinations thereof, and the like. At least some instances of the assets may have identity properties in different formats, which use different values (e.g., different IP addresses, names, or MAC addresses), which use different types of identifying values (e.g., one control uses name while another uses MAC address, or one control uses IP address while another uses MAC address), and other control-specific aspects of expressing the identity of a given asset which may cause the same asset to be represented differently in data between different controls.

In an further embodiment, the asset-identifying data is enriched, and the enriched asset-identifying data is used to correlate between data from different controls. The enrichment may include, but is not limited to, mapping between addresses related to assets (e.g., mapping network addresses used by assets), text matching between names (e.g., to identify different instances of the same name), both, and the like.

At S260, a risk analysis is performed with respect to one or more assets based on the mapping. In an embodiment, the risk analysis includes analyzing risk amplifiers and risk reducers. In a further embodiment, the risk reducers include risk reducers defined with respect to security controls deployed with respect to the assets, a computing environment in which the assets are deployed, or both. That is, the risk reducers account for the mitigating effect different security controls may have on the severity, likelihood, or both, of a cybersecurity incident affecting the protected asset in the event of a breach.

In an embodiment, the effects of the risk reducers (e.g., an effect on a risk score which takes into account both risk amplifiers and risk reducers) is determined based on the mapping between control capabilities and cyber threat patterns. More specifically, the connections represented as edges between control capability nodes and cyber threat pattern nodes may be leveraged in order to simulate the effects of different control deployments and configurations. That is, control configurations and deployments which realize certain control features or combinations of control features may be simulated, where the simulation includes assigning one or more risk reduction rules defined based on which control features are presented, the extent to which each control feature mitigates a particular aspect of a cyber threat, both, and the like. The extent to which each control feature mitigates an aspect of a cyber threat may be based on a determined effectiveness of the capability with respect to a certain pattern of behavior (e.g., an attack pattern), which may be represented in the mapping as a value attached to an edge between the control capability node and the cyber threat pattern node.

An example process for risk analysis which may be utilized at S260 is described further below with respect to FIG. 4.

At S270, one or more attack patterns or other discrete aspects of a detected cyber threat are identified. The attack patterns or other discrete aspects of the cyber threat may be indicated in alerts or other data generated by cybersecurity tools which monitor for such cyber threats (e.g., tools among the security controls deployed with respect to a computing environment). Alternatively, the attack patterns may be determined by analyzing data leading up to the detection of the cyber threat. To this end, in some embodiments, S270 further includes analyzing communications data for communications occurring in the computing environment with respect to behaviors of other components in the computing environment for potential anomalies. In yet a further embodiment, identifying the attack patterns or other discrete aspects of the cyber threat further includes determining one or cyber threat aspect nodes in the mapping.

At S280, one or more control features for mitigating the attack patterns of the detected cyber threat are determined based on the mapping. In an embodiment, determining the control patterns for mitigating the attack patterns includes analyzing the mapping with respect to the attack patterns in order to determine control features which are connected to the attack patterns via the mapping. In a further embodiment, control features are determined such that one or more control features are determined for each attack pattern of the potential cyber threat. In other words, the control features are determined such that the control features collectively can be used to mitigate all aspects of the potential cyber threat, thereby ensuring that any affected assets are adequately protected.

At S290, one or more remediation actions are performed in order to remediate the detected cyber threat. In an embodiment, the remediation actions include reconfiguring one or more controls, deploying or modifying deployment of one or more controls, or both. In a further embodiment, the reconfiguration, deployment or modification of deployment, or both, are performed such that the set of controls in the computing environment have all of the determined control features enabled with respect to the protected asset which is to be protected against the cyber threat. That is, after the remediation actions, the security controls are configured and deployed such that each of the determined control features is enabled with respect to that protected asset.

Figure 3:
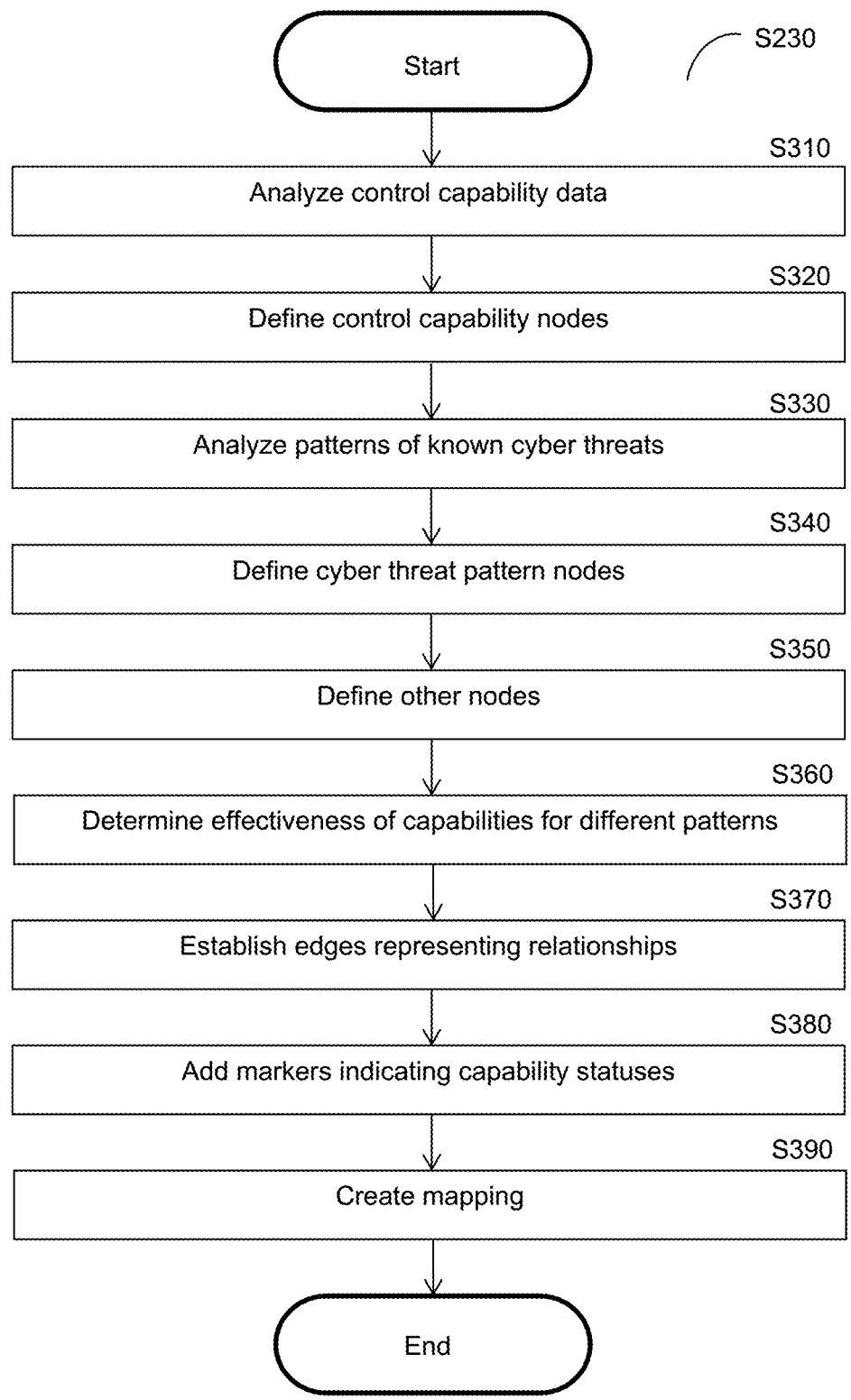
FIG. 3 is a flowchart illustrating a method for mapping security controls to cyber threats according to an embodiment.

FIG. 3 is a flowchart S230 illustrating a method for mapping security controls to cyber threats according to an embodiment.

At S310, control capability data of one or more controls is analyzed. The control capability data may include, but is not limited to, code (e.g., code used by the controls in order to perform security control activities), metadata, both, and the like, for the controls. In an embodiment, the analysis of the control capability data includes applying capability identification rules defining aspects of functions, processes, routines, subroutines, and the like, which are indicative of control capabilities. Such control identification rules may be defined with respect to predetermined types of control activities which a control may engage in such as, but not limited to, anti-spyware activities, vulnerability detection, network-based filtering (e.g., URL filtering), blocking (e.g., file or traffic blocking), data-based filtering, denial of service (DOS) protection, combinations thereof, and the like.

At S320, control capability nodes are defined. Each control capability node represents a corresponding control capability. More specifically, each control capability node represents a distinct control capability such as, but not limited to, a control feature. Non-limiting example control features include control features for anti-spyware, vulnerability detection, network-based filtering, blocking, data-based filtering, DoS protection, combinations thereof, and the like.

At S330, patterns of known cyber threats are analyzed in order to identify one or more such patterns. In an embodiment, the identified patterns include known attack patterns of cyber-attacks, for example, as predetermined and defined in a set of known tactics, techniques, and procedures (TTPs). Such TTPs can be utilized to identify previously observed attack patterns, which in turn may be utilized to define attack patterns in a manner which may be represented as nodes in a graph or otherwise may allow for mapping. To this end, in such an embodiment, analyzing the patterns of known cyber threats includes analyzing one or more sets of TTPs in order to identify technique definitions, where each technique definition defines a pattern or other aspect of a cyber-attack presented by a respective cyber threat.

At S340, cyber threat pattern nodes are defined based on the identified cyber threat patterns. Each cyber threat pattern node represents a corresponding cyber threat pattern among the cyber threat patterns identified at S330.

At optional S350, other nodes are defined for the mapping. The other nodes may include, but are not limited to, nodes representing assets, nodes representing components used in attacks, nodes representing other software components which may access the assets, other software components which may manage access to the assets, networks or network components via which the assets can be accessed, combinations thereof, and the like. Such additional nodes may be utilized to further improve use of the mapping for remediation purposes, for example, by aiding in identifying control gaps or otherwise aiding in identifying situations where mitigation actions may require in addition to determining which control features should be utilized to mitigate a given cyber threat.

In an embodiment, the other nodes include security control nodes representing corresponding security nodes. These security control nodes may be utilized to represent security controls known or otherwise discovered to have certain control capabilities represented among the control capability nodes, and may therefore be utilized to determine whether existing controls adequately protect a given asset or whether there is a security control gap with respect to that asset, which new controls to deploy when remediating a control gap, or both. That is, previously identified capabilities of corresponding controls may be utilized to determine if a current control deployment provides all control capabilities (e.g., control features) required to effectively remediate cyber threats demonstrating certain patterns.

In some embodiments, the other nodes may be utilized to determine potential paths of exploitation. Such potential paths of exploitation may be utilized to determine potential deployment locations, which in turn may be utilized to identify control gaps. To this end, in such an embodiment, identifying such gaps in coverage includes determining, for each potential path of exploitation, whether a control is deployed along the potential path of exploitation and, in particular, such that the control is in-line between the asset and one or more other computing components along the potential path of exploitation, or otherwise deployed such that the control detects or mitigates threats realized via traffic between the asset and the other computing components along the potential path of exploitation.

At S360, effectiveness of the control capabilities for different patterns among the patterns of cyber threats is determined. More specifically, the effectiveness of control capabilities represented by corresponding control capability nodes is determined with respect to patterns represented by corresponding cyber threat pattern nodes. In some implementations, the effectiveness of the control capabilities may be determined based on predetermined data indicating whether and how effective a given control capability is for mitigating a given attack pattern.

In an embodiment, determining the effectiveness of the control capabilities includes analyzing historical data indicating which control capabilities were enabled during cyber-attacks involving certain attack patterns in order to determine how effective the control capabilities were for each of the attack patterns. To this end, in a further embodiment, determining the effectiveness of the control capabilities also includes analyzing whether the cyber threat was successfully mitigated, how quickly the cyber threat was mitigated, how much harm was caused prior to the cyber threat being mitigated when a certain control capability is enabled, or a combination thereof. More specifically, any or all of these factors may be scored and utilized to generate an effectiveness score. Moreover, in some embodiments, respective weights may be assigned to these factors, and the effectiveness score may be generated using a weighted scoring process.

At S370, edges representing relationships between nodes in the mapping are established. In an embodiment, the edges at least include effectiveness edges which represent whether and how effective certain control capabilities represented by the control capability nodes are at mitigating or otherwise remediating certain cyber threat patterns represented by the cyber threat pattern nodes.

As noted above, in some embodiments, other nodes including security control nodes may be defined and utilized for purposes such as remediation. To this end, in such an embodiments, the established edges may further include capability-indicating edges representing which control capabilities are available to different security controls. Each capability-indicating edge may therefore connect a control capability node to a security control node.

At optional S380, markers indicating capability statuses may be added to the edges between control capability nodes and control nodes representing certain controls. Each marker may indicate a status such as, but not limited to, whether the control capability is enabled for a given control having a current configuration. That is, in an embodiment, the capability status markers effectively indicate whether each control feature is turned on for a given control which is configured such that the control feature is available to that control. The markers indicating capability statuses may be utilized, for example, in order to check whether certain control features are enabled with respect to certain protected assets. As a non-limiting example, such checking may be utilized to determine whether there is a control gap related to control capabilities by checking whether each control feature to be enabled with respect to a particular protected asset are, in fact, enabled for a control protecting that asset.

At S390, the mapping is created. The mapping includes at least the nodes and edges related to establishing effectiveness of certain control capabilities for remediation (e.g., the control capability nodes, the cyber threat pattern nodes, and the effectiveness edges), and may further include the other nodes (e.g., security control nodes or nodes representing other components and systems), the capability-indicating edges, both, and the like. Nodes among the defined nodes are connected to each other via the edges.

Figure 4:
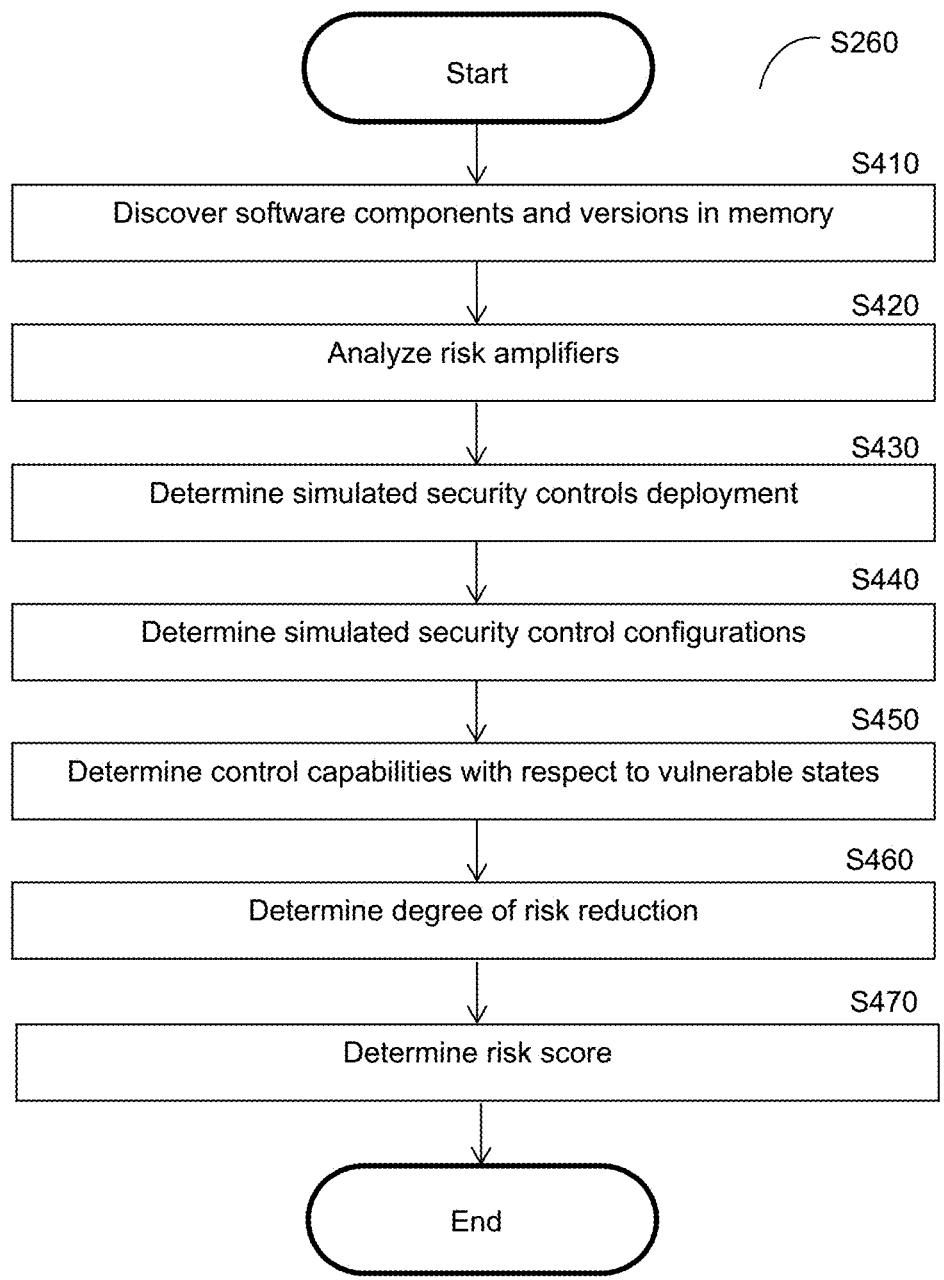
FIG. 4 is a flowchart illustrating a method for risk analysis according to an embodiment.

FIG. 4 is a flowchart S260 illustrating a method for risk analysis according to an embodiment.

At S410, software components, versions of software components, or both, are discovered in-memory. In an embodiment, discovering such components and versions includes performing an analysis of data in-memory. More specifically, in some embodiments, the analysis may be performed at least with respect to libraries loaded into memory. That is, software components may be discovered by identifying libraries loaded into memory, where the software components may utilize certain libraries or combinations of libraries at runtime such that each software component corresponds to a respective library or combination of libraries.

By analyzing software components discovered via in-memory analysis as described herein, data in-memory can be leveraged in order to analyze impact or risk with respect to actual real-time activities rather than solely to categorize software being run in an environment.

It should be noted that S410 is described with respect to discovering software components in-memory, but that in at least some embodiments, additional software components may be discovered outside of in-memory analysis, for example via static scan of program files or other data stored in non-memory data locations.

At S420, potential risk amplifiers are analyzed. The risk amplifiers are factors which amplify or otherwise increase risk of harm by potential vulnerable states.

In an embodiment, analyzing the potential risk amplifiers includes performing an impact analysis in order to determine one or more impact-related risk amplifiers. The results of the impact analysis may be used as risk amplifiers or otherwise may be utilized in order to determine risk amplifiers to be used in determining the applicable scores.

In addition to risk amplifiers related to impact, in some embodiments, analyzing the potential risk amplifiers may include applying one or more additional risk amplifiers based on factors such as, but not limited to, asset criticality (e.g., operations criticality as discussed above). The asset criticality is based on the potential impact of harm which would be caused by malicious access to one or more assets which are accessible to a software component corresponding to a given vulnerable state. To this end, the asset criticality may be a predetermined value for each software component, or may be determined by applying one or more asset criticality determination rules for each software component.

The asset criticality determination rules may be defined with respect to factors such as, but not limited to, tags in an asset inventory (e.g., by identifying predetermined tags known to indicate criticality), name analysis (e.g., by applying predetermined name criticality analysis rules), user inputs (e.g., based on user inputs explicitly indicating that an asset is critical), combinations thereof, and the like.

At S430, deployments of simulated security controls are determined. In an embodiment, determining the deployments of the simulated security controls includes analyzing the mitigation actions to be simulated in order to determine deployments of security controls which would result from implementing the mitigation actions. More specifically, the mitigation actions may be analyzed with respect to predetermined portions of instructions (e.g., certain predetermined verbs in code) of the mitigation actions known to indicate deployment, as well as any location indicators or any other data indicating how the controls are to be deployed in the instructions for each mitigation action. The deployments determined in this manner are used for determining risk scores, thereby realizing the simulation as discussed further below.

In this regard, it is noted that the deployment of certain security controls with respect to certain software components may mitigate the likelihood that vulnerable states will cause harm at runtime or otherwise mitigate a degree of harm such that even a potentially high impact vulnerable state (i.e., a vulnerability which would cause a large amount of harm if exploited) may present a lower overall degree of risk (e.g., because there are appropriate security controls deployed to reduce the likelihood of a successful exploit or to prevent widespread harm even if exploitation is successful).

At S440, configurations of the simulated security controls are determined. In an embodiment, determining the configurations of the simulated security controls includes analyzing the mitigation actions to be simulated in order to determine configurations of security controls which would result from implementing the mitigation actions. More specifically, the mitigation actions may be analyzed with respect to predetermined portions of instructions (e.g., certain predetermined verbs in code) of the mitigation actions known to indicate changes in configuration, as well as any data indicating how the controls are to be reconfigured in the instructions for each mitigation action. The configurations determined in this manner are used for determining risk scores, thereby realizing the simulation as discussed further below.

In an embodiment, the configurations may be determined with respect to predetermined sets of configuration settings. Such configuration settings may be a predetermined set of configuration settings for each type of security control, may be defined for different kinds of vulnerable states (e.g., different CVEs), combinations thereof, and the like. The configurations may be utilized to determine the degree of risk reduction, and may further be analyzed based on historical risk reduction for different kinds of vulnerable states. As a non-limiting example, configurations which historically were effective at avoiding or mitigating cyber threats with respect to a certain kind of vulnerable state may be determined as effective against that kind of vulnerable state such that risk is reduced with respect to the same kind of vulnerable state when those configurations are present.

At S450, control capabilities are determined with respect to one or more vulnerable states, i.e., vulnerable states in or related to one or more assets to be secured using the mitigation actions.

In an embodiment, the control capabilities of the security controls are determined with respect to one or more categories of vulnerable states. In a further embodiment, the capabilities (e.g., either individual capabilities or combinations of capabilities) may be scored using predetermined capability scoring rules with respect to known degrees of effectiveness of respective capabilities or combinations of capabilities in avoiding or mitigating exploitation of certain categories of vulnerable states. Such scoring of the effectiveness of various capabilities of security controls in avoiding or mitigating vulnerable states may be utilized, for example, in order to determine a total risk reduction for the security controls (e.g., based on any or all of presence of security controls, capabilities with respect to categories of vulnerable states, capabilities with respect to specific types of vulnerable states, combinations thereof, and the like), which in turn may be utilized for determining risk scores as discussed herein.

In yet a further embodiment, determining the control capabilities includes determining a type of trigger for each security control defined with respect to one or more networks. In a further embodiment, the type of trigger is either triggerable via those networks or triggerable only locally (e.g., via endpoints but not via external systems via those networks). In yet a further embodiment, the type of trigger for each security control may be determined based further on a reachability analysis (e.g., a reachability analysis as described further above). The type of trigger for each security control may be utilized, for example, in order to determine capability scores. As a non-limiting example, predetermined capability scoring rules may score security controls which are capable of being triggered via networks higher (i.e., representing that the security controls are more capable of mitigating vulnerable stats) than security controls which are only capable of being triggered locally.

In another embodiment (alternatively or in combination with determining capabilities with respect to categories of vulnerable states), the determined control capabilities may include capabilities defined with respect to specific types of vulnerable states. Such capabilities may be capabilities defined as being utilized to prevent or otherwise mitigate exploitation of the vulnerable state. In a further embodiment, the capabilities (e.g., either individual capabilities or combinations of capabilities) may be scored using predetermined capability scoring rules with respect to known degrees of effectiveness of respective capabilities or combinations of capabilities in avoiding or mitigating exploitation of certain specific types of vulnerable states. A specific type of vulnerable state may be a particular known vulnerability or exploit, for example, as defined in a set of common vulnerabilities and exploits (CVEs).

As a non-limiting example for a security control in the form of a web application firewall (WAF), a WAF with rules or other settings known to block a specific type of vulnerable state (e.g., a specific CVE) is determined to be capable of mitigating that type of vulnerable state. As another non-limiting example for a WAF security control, a WAF with a generic rule that blocks certain kinds of attack vectors (e.g., structured query language injections) known to be associated with a specific CVE is determined to be capable to mitigating that CVE.

At S460, a degree of risk reduction is determined based on the deployments of the security controls, the configurations of the security controls, the capabilities with respect to vulnerability categories, the capabilities for mitigating specific types of vulnerabilities, or a combination thereof. In an embodiment, determining the degree of risk reduction includes determining one or more risk reduction scores representing a degree of risk reduction for each security control, a combined score representing an aggregate degree of risk reduction for the security controls, and the like. Such scores may be utilized to determine an applicable risk score.

At S470, a risk score is determined for the simulated security controls based on the risk amplifiers and the degree of risk reduction. In some implementations, a value (e.g., a risk reduction score) representing the degree of risk reduction may be subtracted from a value (e.g., a risk amplifier score) representing the risk amplifiers in order to determine a value representing the overall degree of risk of a given deployment (i.e., accounting for circumstances that amplify risk as well as circumstances that mitigate risk). As noted above, because this value is determined based on a proposed combination of control deployments and configurations, the overall effect of a given set of controls on a potential risk may be analyzed.

This overall effect, in turn, may aid in aggregating mitigation actions with respect to controls by identifying sets of control configurations and deployments that achieve certain goals with respect to risk such as, but not limited to, minimizing risk, balancing risk against efficiency or effectiveness, and the like. For balancing risk with efficiency or effectiveness, in some embodiments, a maximum tolerable risk score threshold may be predetermined and utilized to determine whether a given set of mitigation actions, even if possible to perform efficiently and effectively, would raise the risk above this threshold and therefore cannot be utilized as the optimal set of mitigation actions. Likewise, differences in risk scores between combinations of potential configurations and deployments of controls which are small (e.g., below a predetermined threshold) may be determined as having minimal effect on risk such that a set of mitigation actions which results in a higher risk combination of configurations and deployments (i.e., higher but within a threshold difference) may be selected over a set of mitigation actions when the higher risk set of mitigation actions can be performed more efficiently (e.g., using fewer controls, with fewer actions, a combination thereof, etc.) or more effectively (e.g., a degree to which the mitigation action is known to effectively mitigate certain types of cyber threats) than the lower risk set of mitigation actions.

Figure 5:
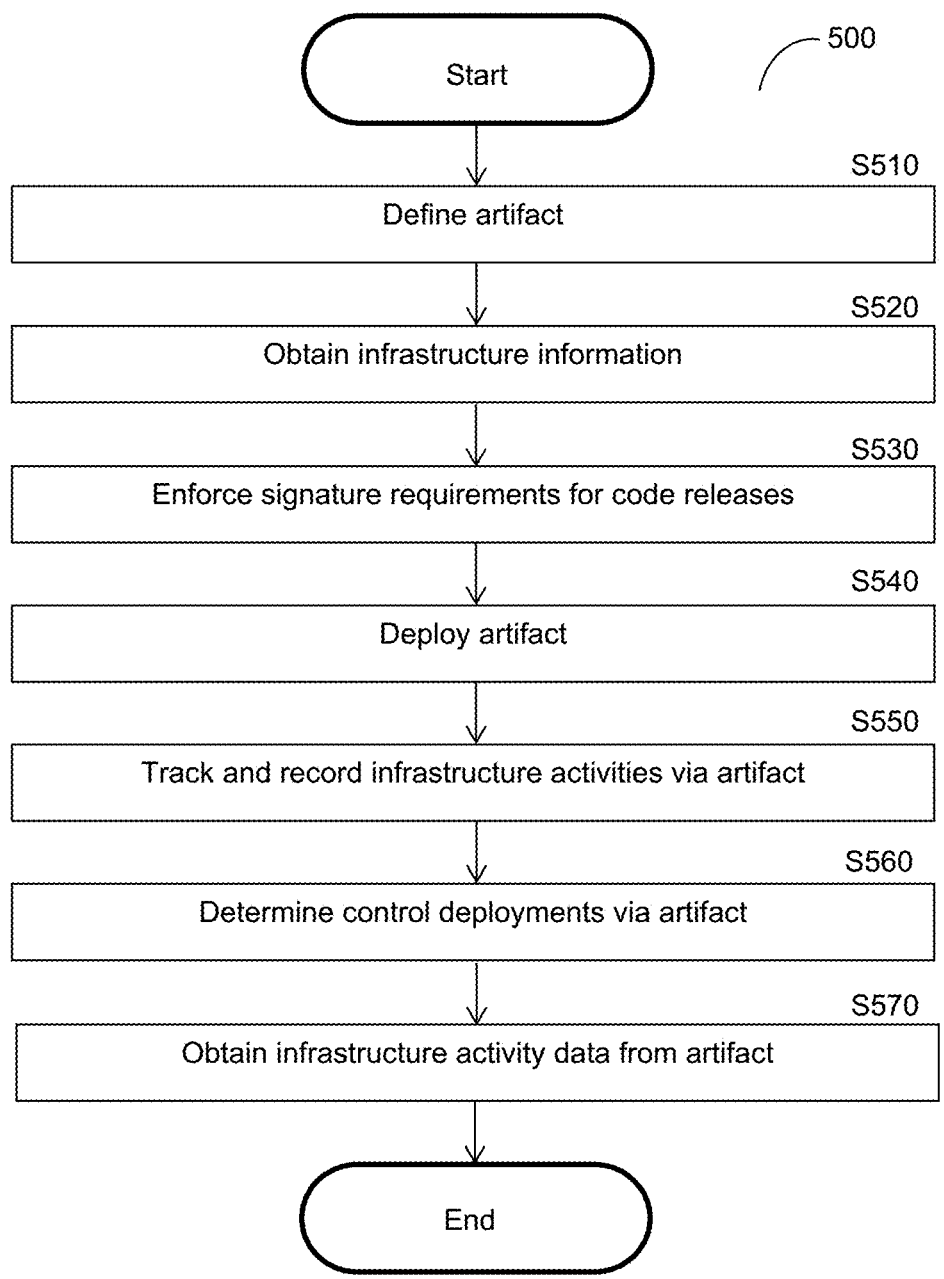
FIG. 5 is a flowchart illustrating a method for integrating with security controls according to an embodiment.

FIG. 5 is a flowchart 500 illustrating a method for integrating with security controls according to an embodiment. In an embodiment, the method is performed by the control manager 130, FIGS. 1A-B.

At S510, an artifact is defined. The artifact is defined such that it is configured at least to can track and record mitigation activities being performed in a computing infrastructure in which it is deployed, as well as to make adjustments within the computing infrastructure (e.g., adjusting configurations of components, altering executable code at runtime, altering compiler code, combinations thereof, and the like). The artifact can be used as a hook to make changes at runtime and at compile time in order to perform mitigation actions as described herein.

In an embodiment, the artifact is or includes instructions in the form of executable code that, when executed by a processing circuitry, configure the processing circuitry to at least perform the activities defined by the instructions of the artifact. To this end, defining the artifact may include defining such instructions and storing a copy of executable instructions encoding such instructions so that the executable code may be copied and deployed.

Once the artifact has been defined, instructions of the artifact may be incorporated into code releases via signing and utilized to implement various disclosed embodiments. To this end, the artifact may be defined as part of a code signing certificate or other piece of data to be used for signing code releases such that any signatures signed using that certificate or data includes an instance of the artifact in the form of a copy of the executable code of the artifact. This, in turn, allows the artifact to serve as a hook in the code release for performing at least a portion of the disclosed embodiments. Such code releases may occur when new components are deployed in the computing infrastructure, i.e., the code releases may include executable code of software components or code to be used by hardware components, and the code of such code releases may include the executable code of the artifact such that the artifact is deployed with any components deployed as part of a given code release signed using the artifact.

At S520, infrastructure information about a computing infrastructure is obtained. The computing infrastructure is a computing infrastructure for which the artifact will be deployed. The infrastructure information may include, but is not limited to, components, processes executed by those components, information indicating which components communication with which other components, combinations thereof, and other information which may be relevant to relative locations where the artifact can be deployed in order to be capable of performing the mitigation actions as described herein. More specifically, the infrastructure information may include information potentially related to code releases (e.g., where code may be deployed), and artifacts may be deployed with each code release such that one or more artifacts are deployed as part of code introduced in any given code release.

At S530, requirements for signatures for code releases are enforced on the computing infrastructure via the artifact. To this end, enforcing the signature requirements for the code releases may include enforcing one or more policies requiring all code releases in the computing infrastructure to be signed using an instance of the artifact. Such policies may be implemented in the computing infrastructure in order to facilitate the disclosed embodiments. In some implementations, the requirements may be enforced via a CI/CD manager (e.g., the CI/CD manager 110, FIGS. 1A-B). To this end, in some embodiments, enforcing the signature requirements may include sending data indicating such policies to the CI/CD manager or otherwise instructing the CI/CD manager to enforce such policies. Moreover, enforcing the signature requirements may include sending a copy of the executable code of the artifact to be used for signing according to the signing policies being enforced.

At S540, the artifact is deployed with respect to the computing infrastructure. The artifact is deployed such that it can track, and record mitigation activities being performed in at least a portion of the computing infrastructure, as well as such that it can make adjustments within the relevant portion of the computing infrastructure (e.g., adjusting configurations of components, altering executable code at runtime, altering compiler code, combinations thereof, and the like). More specifically, in accordance with the policies enforced at S430, an instance of the artifact may be created and deployed in one or more portions of code for every code release via signing of the code release with such an artifact instance.

In some embodiments, multiple artifacts may be deployed and utilized in the process of FIG. 5. As noted above, each artifact may be realized as a set of instructions in the form of executable code included in a certificate or other data incorporated in signatures. To this end, the artifact is deployed as part of deployment of any code releases signed using the artifact.

At S550, mitigation activities being performed in the computing infrastructure are tracked, and data indicating the mitigation activities are recorded via the artifact. The data recorded by the artifact may include an indication of mitigation actions performed with respect to each process or other component in the infrastructure. More specifically, the activities tracked via the artifact may include activities performed by a set of controls within the computing environment.

At S560, control deployments are determined based on the infrastructure activities tracked via the artifact. In an embodiment, the artifact includes code for determining the control deployments. To this end, in such an embodiment, determination of the control deployments is realized via execution of the code via the artifact.

At S570, infrastructure activity data is obtained from the artifact. In an embodiment, the infrastructure activity data includes activities performed by controls within the computing environment such as, but not limited to, mitigation actions. In a further embodiment, the infrastructure activity data also includes the control deployments determined via the artifact. Such control deployments and other infrastructure data may be utilized as described herein to identify control gaps (e.g., based on locations where controls should be deployed but are not according to the control deployments), to report on potential control gaps (e.g., as part of an output illustrated via graphical user interface), both, and the like.

It should be noted that certain embodiments discussed with respect to FIG. 5 are described as using one artifact, but that at least some disclosed embodiments are not limited as such may be equally applicable to implementations using multiple artifacts. As a non-limiting example, multiple artifacts may be deployed in a computing environment, with each artifact tracking and recording infrastructure activities for a respective portion of the computing environment. In such embodiments, control deployments within the computing environment may be determined based on infrastructure activities tracked by multiple artifacts.

Figure 6:
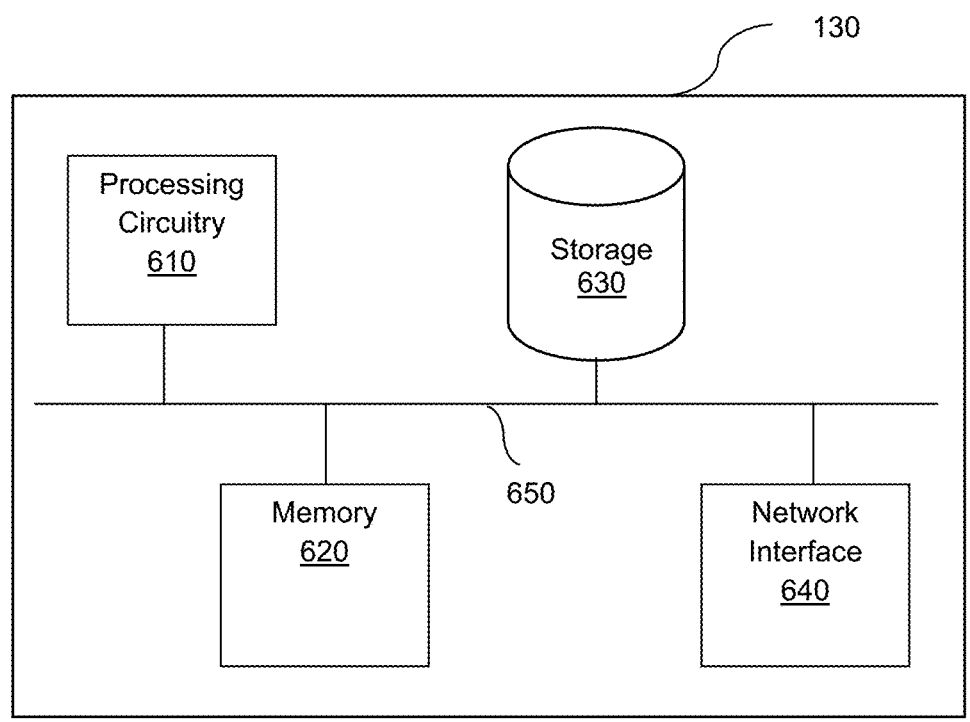
FIG. 6 is a schematic diagram of a control manager according to an embodiment.

FIG. 6 is an example schematic diagram of a control manager 130 according to an embodiment. The control manager 130 includes a processing circuitry 610 coupled to a memory 620, a storage 630, and a network interface 640. In an embodiment, the components of the control manager 130 may be communicatively connected via a bus 650.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 620 may be volatile (e.g., random access memory, etc.), non-volatile (e.g., read only memory, flash memory, etc.), or a combination thereof.

In one configuration, software for implementing one or more embodiments disclosed herein may be stored in the storage 630. In another configuration, the memory 620 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 610, cause the processing circuitry 610 to perform the various processes described herein.

The storage 630 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 640 allows the control manager 130 to communicate with other systems, devices, components, applications, or other hardware or software components, for example as described herein.

It should be understood that the embodiments described herein are not limited to the specific architecture illustrated in FIG. 6, and other architectures may be equally used without departing from the scope of the disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various embodiments disclosed herein can be implemented as hardware, firmware, software, or any combination thereof. Moreover, the software may be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for security control mapping, comprising:
   defining a plurality of security control capability nodes corresponding to a plurality of security control capabilities of a plurality of security controls, wherein each security control capability node represents a corresponding security control capability of the plurality of security controls, wherein each security control is a cybersecurity tool;
   defining a plurality of cyber threat pattern nodes corresponding to a plurality of cyber threat patterns of a plurality of cyber threats, wherein each cyber threat pattern node represents a corresponding cyber threat pattern of the plurality of cyber threat patterns;
   establishing a plurality of edges, wherein the plurality of edges includes a first plurality of edges defined between the plurality of security control capability nodes and the plurality of cyber threat pattern nodes, wherein the plurality of edges collectively represent a predetermined effectiveness of each security control capability of the plurality of security control capabilities for addressing at least one respective cyber threat pattern of the plurality of cyber threat patterns;
   creating a mapping including the plurality of security control capability nodes connected at least via the plurality of edges to the plurality of cyber threat pattern nodes; and
   performing at least one remediation action based on the mapping.

2. The method of claim 1, wherein the plurality of cyber threats is a plurality of first cyber threats, wherein performing the at least one remediation action further comprises:
   determining at least one cyber threat pattern of a second cyber threat; and
   determining at least one control capability for mitigating the second cyber threat based on the determined at least one cyber threat pattern threat and the mapping, wherein the at least one remediation action is determined based further on the determined at least one control capability for mitigating the second cyber threat.

3. The method of claim 1, further comprising:
   adding, to the mapping, a plurality of markers indicating a control capability status for at least a portion of the plurality of security control capabilities, wherein the at least one remediation action is determined based further on the plurality of markers.

4. The method of claim 1, further comprising:
   deduplicating instances of asset-identifying data generated by the plurality of security controls, wherein deduplicating the instances includes uniquely identifying each of the instances as corresponding to a respective protected computing asset by correlating between sets of the asset-identifying data output by respective security controls of the plurality of security controls based on the mapping;
   identifying at least one security control gap based on the deduplicated instances, wherein the at least one remediation action is determined based further on the identified at least one security control gap.

5. The method of claim 1, further comprising:
   identifying at least one security control gap based on the mapping, wherein identifying the at least one security control gap further includes determining a path of exploitation between a respective computing asset and at least one of the plurality of security controls, wherein the at least one remediation action is determined based further on the identified at least one security control gap.

6. The method of claim 1, further comprising:
   integrating with the plurality of security controls, wherein integrating with the plurality of security controls further comprises deploying an artifact in a computing environment, wherein the artifact is configured to record a plurality of activities performed in the computing environment by the plurality of security controls, wherein the mapping is created based further on the recorded plurality of activities.

7. The method of claim 1, wherein the plurality of cyber threat pattern nodes is defined based further on at least one predetermined set of tactics, techniques, and procedures.

8. The method of claim 1, wherein the plurality of security control capabilities include at least one of: anti-spyware features, vulnerability detection features, uniform resource filtering features, file blocking features, data filtering features, and denial of service protection features.

9. The method of claim 1, wherein performing the remediation actions includes reconfiguring at least one of the plurality of security controls.

10. A non-transitory computer readable medium having stored thereon instructions for causing a processing circuitry to execute a process, the process comprising:
    defining a plurality of security control capability nodes corresponding to a plurality of security control capabilities of a plurality of security controls, wherein each security control capability node represents a corresponding security control capability of the plurality of security controls, wherein each security control is a cybersecurity tool;
    defining a plurality of cyber threat pattern nodes corresponding to a plurality of cyber threat patterns of a plurality of cyber threats, wherein each cyber threat pattern node represents a corresponding cyber threat pattern of the plurality of cyber threat patterns;
    establishing a plurality of edges, wherein the plurality of edges includes a first plurality of edges defined between the plurality of security control capability nodes and the plurality of cyber threat pattern nodes, wherein the plurality of edges collectively represent a predetermined effectiveness of each security control capability of the plurality of security control capabilities for addressing at least one respective cyber threat pattern of the plurality of cyber threat patterns;

creating a mapping including the plurality of security control capability nodes connected at least via the plurality of edges to the plurality of cyber threat pattern nodes; and performing at least one remediation action based on the mapping.

11. A system for security control mapping, comprising:
a processing circuitry; and
a memory, the memory containing instructions that, when executed by the processing circuitry, configure the system to:
define a plurality of security control capability nodes corresponding to a plurality of security control capabilities of a plurality of security controls, wherein each security control capability node represents a corresponding security control capability of the plurality of security controls, wherein each security control is a cybersecurity tool;
define a plurality of cyber threat pattern nodes corresponding to a plurality of cyber threat patterns of a plurality of cyber threats, wherein each cyber threat pattern node represents a corresponding cyber threat pattern of the plurality of cyber threat patterns;
establish a plurality of edges, wherein the plurality of edges includes a first plurality of edges defined between the plurality of security control capability nodes and the plurality of cyber threat pattern nodes, wherein the plurality of edges collectively represent a predetermined effectiveness of each security control capability of the plurality of security control capabilities for addressing at least one respective cyber threat pattern of the plurality of cyber threat patterns;
create a mapping including the plurality of security control capability nodes connected at least via the plurality of edges to the plurality of cyber threat pattern nodes; and
perform at least one remediation action based on the mapping.

12. The system of claim 11, wherein the plurality of cyber threats is a plurality of first cyber threats, wherein the system is further configured to:
determine at least one cyber threat pattern of a second cyber threat; and
determine at least one control capability for mitigating the second cyber threat based on the determined at least one cyber threat pattern threat and the mapping, wherein the at least one remediation action is determined based further on the determined at least one control capability for mitigating the second cyber threat.

13. The system of claim 11, wherein the system is further configured to:
add, to the mapping, a plurality of markers indicating a control capability status for at least a portion of the plurality of security control capabilities, wherein the at least one remediation action is determined based further on the plurality of markers.

14. The system of claim 11, wherein the system is further configured to:
deduplicate instances of asset-identifying data generated by the plurality of security controls, wherein deduplicating the instances includes uniquely identifying each of the instances as corresponding to a respective protected computing asset by correlating between sets of the asset-identifying data output by respective security controls of the plurality of security controls based on the mapping;
identify at least one security control gap based on the deduplicated instances, wherein the at least one remediation action is determined based further on the identified at least one security control gap.

15. The system of claim 11, wherein the system is further configured to:
identify at least one security control gap based on the mapping, wherein identifying the at least one security control gap further includes determining a path of exploitation between a respective computing asset and at least one of the plurality of security controls, wherein the at least one remediation action is determined based further on the identified at least one security control gap.

16. The system of claim 11, wherein the system is further configured to:
integrate with the plurality of security controls, wherein integrating with the plurality of security controls further comprises deploying an artifact in a computing environment, wherein the artifact is configured to record a plurality of activities performed in the computing environment by the plurality of security controls, wherein the mapping is created based further on the recorded plurality of activities.

17. The system of claim 11, wherein the plurality of cyber threat pattern nodes is defined based further on at least one predetermined set of tactics, techniques, and procedures.

18. The system of claim 11, wherein the plurality of security control capabilities include at least one of: antispyware features, vulnerability detection features, uniform resource filtering features, file blocking features, data filtering features, and denial of service protection features.

19. The system of claim 11, wherein performing the remediation actions includes reconfiguring at least one of the plurality of security controls.

* * * * *